(12) United States Patent  
Peterkort

(10) Patent No.: US 7,029,218 B2  
(45) Date of Patent: Apr. 18, 2006

(54) LOCKING FASTENER FOR THREADED JOINT WITH SIGHT GAUGE

(75) Inventor: Steven D. Peterkort, Hawthorn Woods, IL (US)

(73) Assignee: Okabe Corporation, Vernon Hills, IL (US)

( * ) Notice: Subject to any disclaimer, the term of this patent is extended or adjusted under 35 U.S.C. 154(b) by 0 days.

(21) Appl. No.: 10/118,563

(22) Filed: Apr. 8, 2002

(65) Prior Publication Data

US 2003/0190212 A1 Oct. 9, 2003

(51) Int. Cl.  
*F16B 39/10* (2006.01)

(52) U.S. Cl. .................. 411/198; 411/221; 411/119

(58) Field of Classification Search ........ 411/119–121, 411/140, 197, 198, 204, 214, 221  
See application file for complete search history.

(56) References Cited

U.S. PATENT DOCUMENTS

| | | | |
|---|---|---|---|
| 851,964 A | * | 4/1907 | Rosenkranz |
| 1,040,215 A | * | 10/1912 | Kriner |
| 1,231,840 A | * | 7/1917 | Bolt |
| 5,199,838 A | * | 4/1993 | Luke |
| 5,533,794 A | * | 7/1996 | Faison |
| 5,618,143 A | * | 4/1997 | Cronin |
| 5,674,034 A | * | 10/1997 | Bennett |
| 6,290,442 B1 | * | 9/2001 | Peterkort |

* cited by examiner

*Primary Examiner*—Flemming Saether  
(74) *Attorney, Agent, or Firm*—Mayer, Brown, Rowe & Maw LLP

(57) ABSTRACT

A locking fastener assembly having a threaded member with a slot, a threaded rotatable fastener having a flange, the flange having a periphery and including at least one aperture extending through the flange, wherein the threaded rotatable fastener is engageable with the threaded member. The flange on the nut further includes a notch along the periphery of the flange. The locking fastener assembly also contains a retainer having an outer margin defining a plurality of notches and a protruding member, wherein the protruding member is engageable with the slot on the threaded member. A locking pin is also provided, wherein the locking pin is engageable with at least one of the threaded apertures in the flange and at least one of the notches in the retainer. In a preferred embodiment, the locking pin is aligned with at least one notch in the retainer when the notch on the flange is aligned with at least one notch on the retainer.

17 Claims, 3 Drawing Sheets

LOCKING FASTENER FOR THREADED JOINT WITH SIGHT GAUGE

FIELD OF INVENTION

The present invention relates to locking fastener assemblies for threaded joints and more particularly to locking fastener assemblies used for automotive, truck and trailer hub assemblies.

BACKGROUND OF INVENTION

Locking fasteners and locking fastener assemblies are used to prevent loosening of a threaded fastener in a fastener joint. There are many types of threaded joints in which loosening of a fastener is undesirable. One example to which the principles of the present invention may be applied is an axle assembly of a vehicle, including automobiles, trucks, trailers or other transportation devices.

In a typical axle assembly, axle bearings are supported between an axle or spindle and a wheel hub or spindle support to permit rotation of a vehicle wheel. An axle bearing nut is used to hold the components together. Usually, the axle bearing assembly is encased with grease and sealed so that outside contaminates, which can lead to premature bearing wear and failure, cannot enter the bearing assembly. Moreover, in order to prevent premature bearing failure, the nut must be installed properly and tightened to the proper torque to avoid excessive axial bearing load or, alternatively, excessive free play. In addition, after assembly, it is important to prevent loosening of the axle bearing nut to avoid bearing failure or even the dangerous loss of a wheel.

A conventional axle assembly includes a spindle with male threads having an axially extending slot. In order to provide for a locking nut that would mate with the spindle, U.S. Pat. No. 6,290,442, also owned by the current assignee, discloses a highly adjustable locking fastener assembly that includes a washer and a nut. The washer includes a multitude of notches on the periphery thereof and a tab received in the axially extending slot of a spindle to permit the washer to move axially, yet prevent the washer from rotating. The nut of this system has a flange that contains a plurality of unequally spaced openings through which bolts would be placed to engaged the notches on the washer, thereby preventing relative rotation between the washer and the nut.

While this prior locking assembly provided an installer with a high number of adjustment positions, it did not allow for easy sight alignment between the holes in the flange of the nut and the notches in the washer. As a result, if an installer was not careful to align the bolt hole on the nut and the notch on the washer, part of the bolt could scrape against the sides of the washer notches, causing metal shaving to fall into the sealed bearing assembly. Such metal shavings could lead to excessive bearing wear. Accordingly, there is a need for an adjustable locking fastener assembly for a threaded joint having a nut and a washer that allows for easy visual alignment of connecting members on the nut and washer.

Other needs will become apparent upon a further reading of the following detailed description taken in conjunction with the drawings.

SUMMARY OF THE INVENTION

In one form of the invention, the aforementioned needs are addressed by a locking fastener assembly having a threaded member with a slot, a threaded rotatable fastener having a flange, the flange having a periphery and including at least one aperture extending through the flange, wherein the threaded rotatable fastener is engageable with the threaded member. The flange on the nut further includes a notch along the periphery of the flange. The locking fastener assembly also contains a retainer having an outer margin defining a plurality of notches and a protruding member, wherein the protruding member is engageable with the slot on the threaded member. A locking pin is also provided, wherein the locking pin is engageable with at least one of the threaded apertures in the flange and at least one of the notches in the retainer. In a preferred embodiment, the locking pin is aligned with at least one notch in the retainer when the notch on the flange is aligned with at least one notch on the retainer.

DETAILED DESCRIPTION OF THE PREFERRED EMBODIMENT

Figure 1:
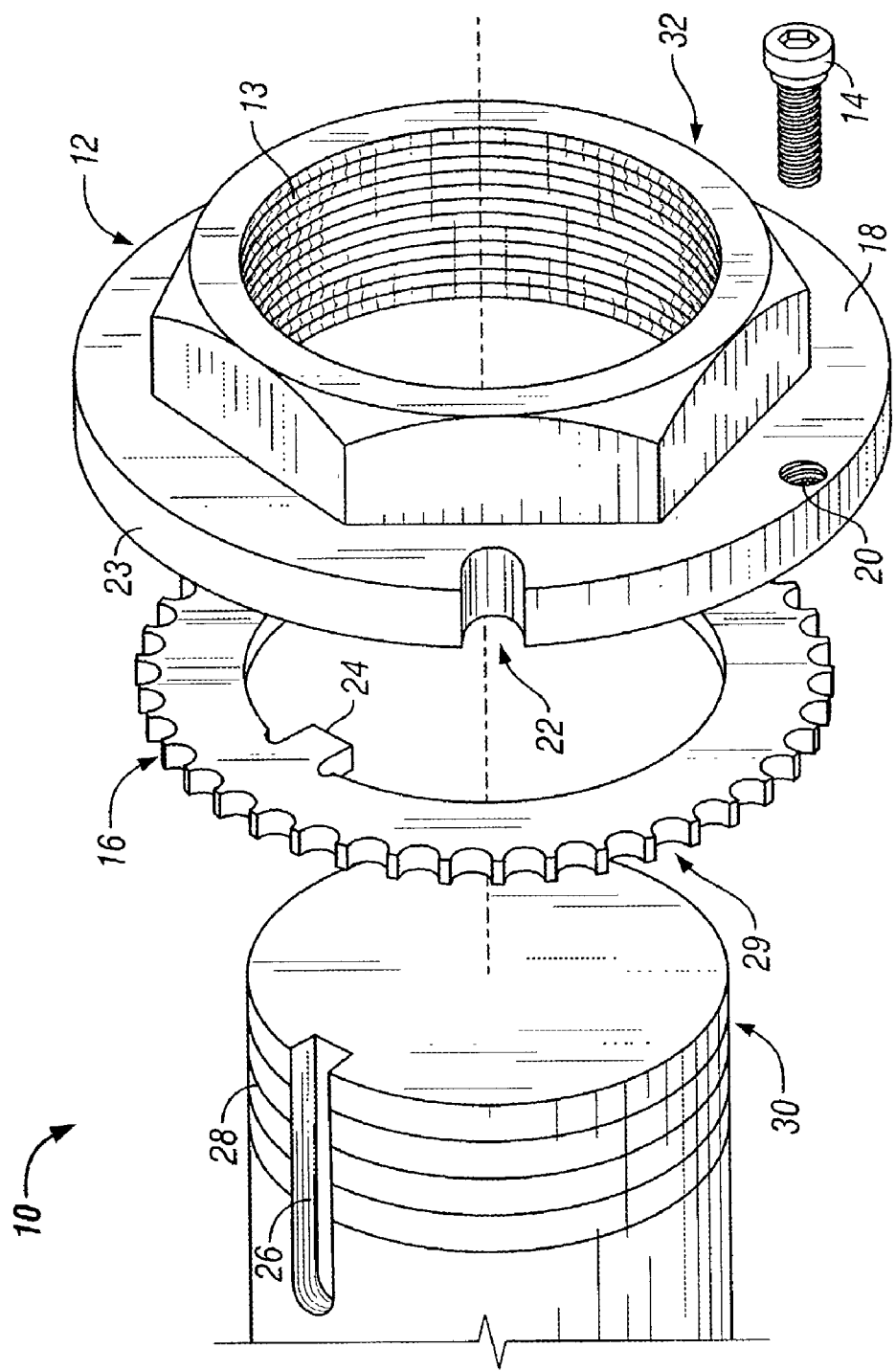
FIG. 1 is a perspective view of the various components of one embodiment of the present invention.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated.

FIG. 1 is a perspective view of the components of one embodiment of the locking fastener assembly 10 of the present invention. The locking fastener assembly 10 includes a nut 12, at least one locking bolt 14 and a retainer washer 16. The nut 12 has a flange 18 with at least one tapped bolt hole 20, where the locking bolts 14 are receivable. The nut 12 also contains internal female threads 13. The locking bolts 14 can be of any configuration, but it is preferred that they comprise a socket head cap screw that receives an allen wrench tool. However, the locking bolts can comprise other bolt configurations, including hex head and torx bolts.

As those skilled in the art will appreciate, there can be a multitude of bolt holes 20 located on the flange 18. In the preferred embodiment of the invention, there are two bolt holes 20 located 180° apart from each other on the flange 18. The nut 12 also contains a sight gauge 22 that preferably comprises a notch located on the periphery of the flange 18. While it is preferred that the notch actually break the plane of the edge 23 of the flange, thus creating a gap in the flange edge 23, those skilled in the art will recognize that the sight gauge 22 can comprise an aperture contained totally within the boundaries of the flange edge 23 and that the flange edge 23 need not have a gap.

Figure 2:
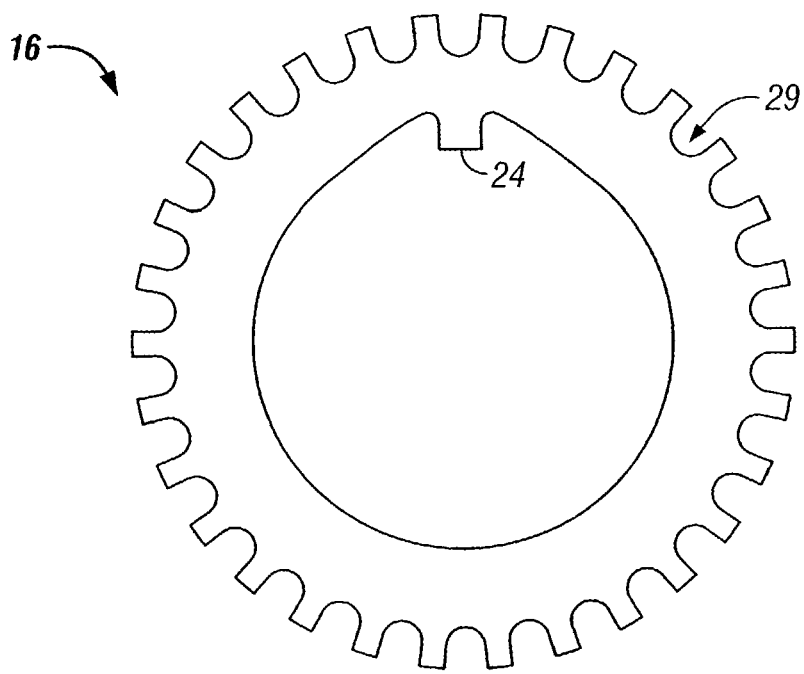
FIG. 2 is a top view of a lock washer in one embodiment of the present invention.

As shown in FIG. 2, the retaining washer 16 has a tongue 24 which is engageable with slot 26 in a spindle 28 (FIG. 1), the spindle 28 having axial threads 30. When the tongue 24 engages with slot 26, the washer 16 is prohibited from rotational movement around spindle 28, but is allowed to move axially in slot 26. The retaining washer 16 also includes notches 29 spaced around the periphery of the retaining washer 16. In a preferred embodiment, there are thirty notches 29. However, one with skill in the art will appreciate that there can be fewer or greater notches, depending on the particular use of the locking fastener assembly 10 and the desired amount of locking locations. The notches 29 are of such dimensions that a locking bolt 14 can pass therethrough. It is preferred that the retaining washer 16 comprise AISI 1050 steel that is oil quenched and tempered to HRC 44–52.

Figure 3:
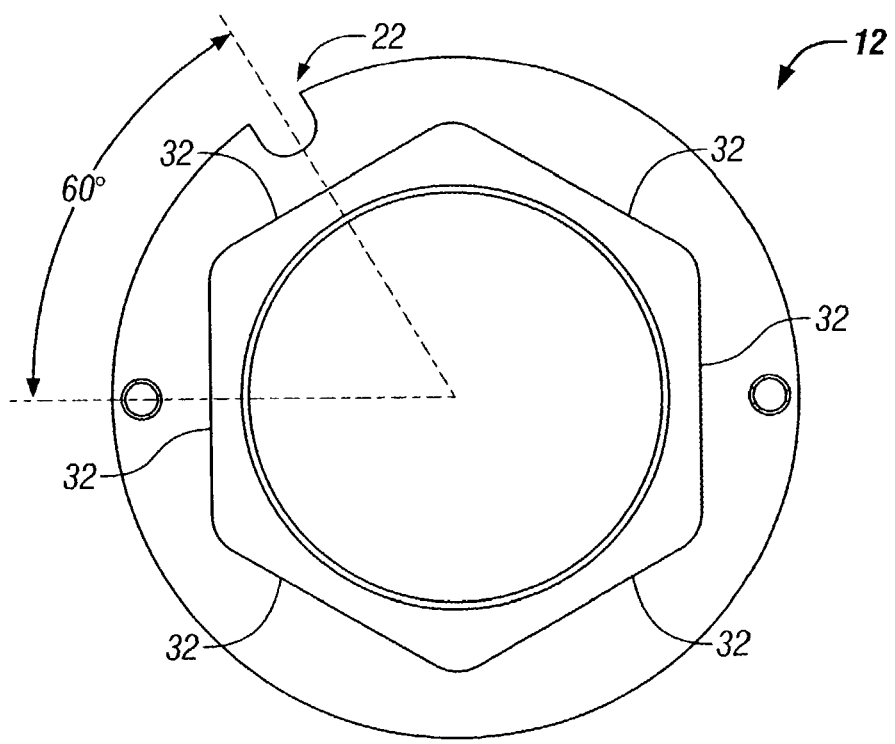
FIG. 3 is a top plan view of a nut in one embodiment of the present invention.
Figure 4B:
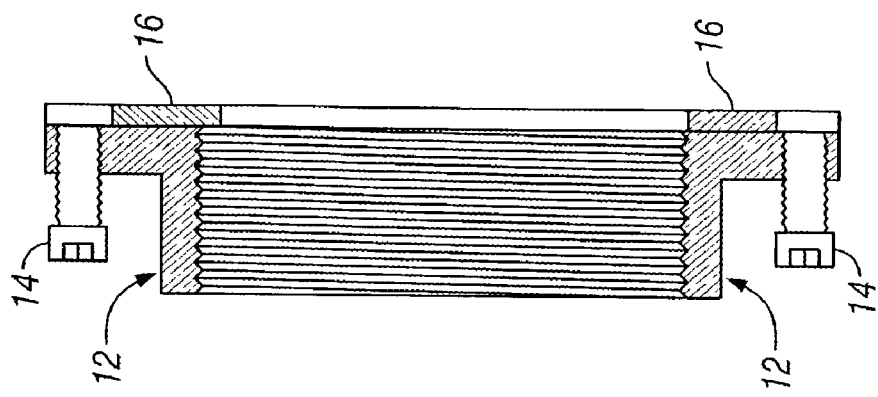
FIG. 4 is a top plan view of a nut superimposed over a lock washer of the present invention, showing the simultaneous alignment of the sight gauge and the flange apertures.
Figure 4A:
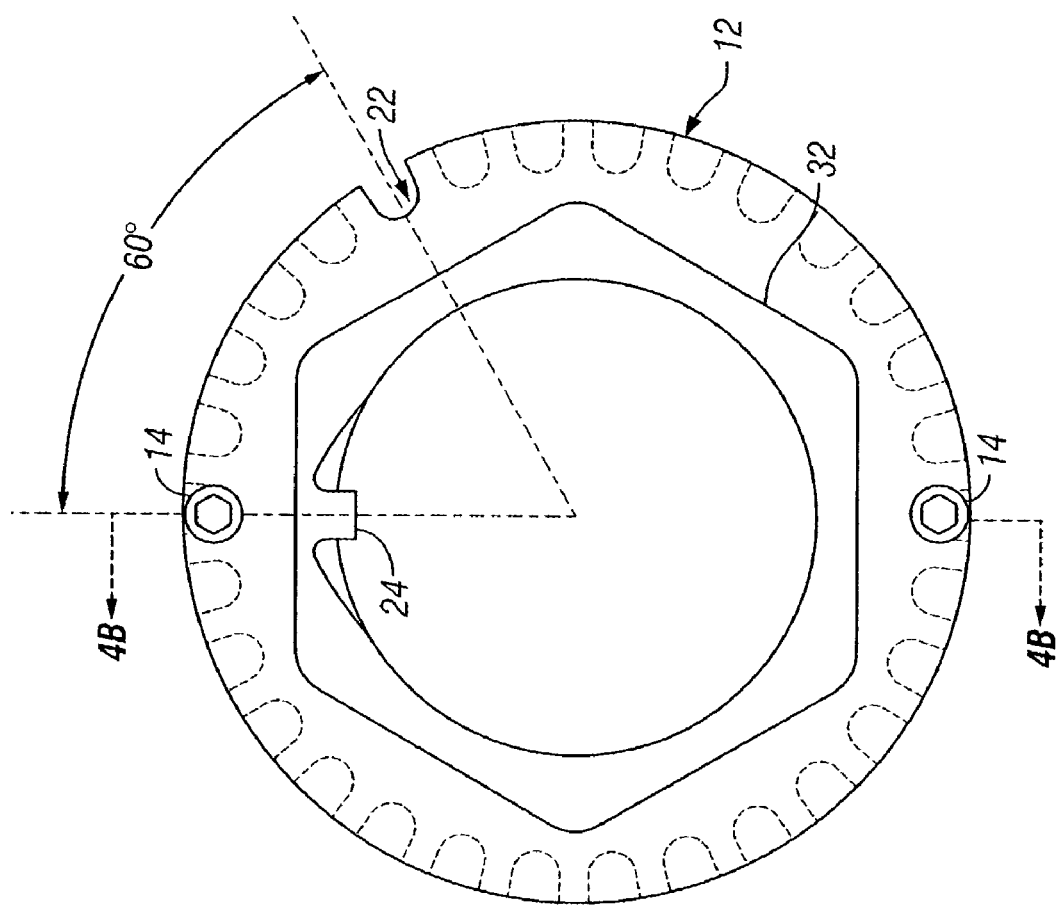

FIG. 3 is a top plan view of a lock nut 12. As shown, the lock nut 12 has 6 wrenching flats 32 that are receivable to a wrench (not shown) for tightening and loosening the nut 12 by rotation clockwise or counter-clockwise on the threads 30 found on spindle 28. The sight gauge 22 is preferably U-shaped and forms a cut-out on the periphery of flange 18. It shall be understood, though, that the sight gauge 22 can be located at other locations on the nut 12 and can be of different configurations. For instance, instead of comprising a U-shaped notch on the periphery of the nut 12, the sight gauge 22 can take the form of an enclosed aperture or slot in the nut 12. Although a U-shaped notch is preferred, it will be understood that the notch can comprise a multitude of shapes and dimensions, such as slots, cylindrical and conical apertures; "D" slot profiles, "V" notches, etc. As those skilled in the art will appreciate, the sight gauge 22 is of such a configuration so that when the nut 12 is assembled with the spindle 28 and the retaining washer 16, an installer can peer through the sight gauge 22 to see if the sight gauge 22 is in alignment with a notch 29 on the retaining washer 16. In a preferred embodiment of the invention, when a notch 29 is lined up with the sight gauge 22, one or more of the tapped bolt holes 20 also lines up with a notch 29. FIG. 4 shows the alignment of the sight gauge 22 and a tapped bolt hole with notches 29.

Preferably, to allow for proper alignment, the sight gauge 22 and any bolt holes 20 will be centered, respectively, along a wrenching flats 32 and thus be spaced approximately 60° apart, or multiples thereof. However, any other placement of the bolt holes 20 and sight gauge 22 that allows for simultaneous alignment with the notches 29 on washer 16 can be used. For instance, bolt holes can be placed anywhere on the flange at appropriate washer notch angles. Moreover there can be numerous bolt holes 20 on the flange. Preferably, however, the maximum number of bolt holes 20 would be the number of retaining washer notches minus one.

In order to give the nut 12 high shear strength, it is preferred that nut 12 is made out of a forged metal (preferably AISI 1141 or 1045) steel). Indeed, it has been found that forging the nut provides much better strength and durability than sintered nuts.

As those skilled in the art will readily understand, operation of the present invention is accomplished by first placing the retainer washer 16 on the spindle 28, making sure to align the tongue 24 with the slot 26. Next, the nut 12 is threaded onto the spindle 28, thereby engaging the male threads 30 on the spindle 28 with the female threads 13 on nut 12.

Once the nut and hub bearing assembly are tightened to the proper torque, an installer peers through the sight gauge 22 to check if a notch 29 is in alignment with the sight gauge 22. If there is not alignment, then the installer rotates the nut 12 slightly until such alignment occurs. Thereafter, at least one locking bolt 14 is threaded into a hole 20 and then tightened until the head of the locking bolt 14 bottoms out on the flange 18. As those skilled in the art will appreciate, locking bolt 14 can include locking washers (not shown) or locking compound on the threads thereof to minimize the chance that the locking bolt 14 will loosen due the vibrations present in a hub assembly. In the preferred embodiment of the invention, there are at least two holes 20 and two locking bolts 14 threaded therethrough when the locking fastener assembly 10 is fully installed. It is further preferred that the locking bolts 14 contain a thread locking mechanism, which is preferably a nylon patch. However, other locking mechanisms could be used.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A locking fastener assembly comprising:
   a threaded member having a slot and a longitudinal axis;
   a threaded rotatable fastener having a flange, said flange having a periphery and including at least one aperture extending through the flange, wherein said threaded rotatable fastener is engageable with said threaded member, said flange further including a notch along the periphery of said flange, wherein there is an angle between the radial location of said notch and the radial location of said at least one aperture;
   a retainer having an outer margin defining a plurality of notches, said retainer further including a protruding member, wherein said protruding member is engageable with said slot on said threaded member and wherein said notch on said rotatable fastener and said plurality of notches on said retainer are substantially the same size in a plane transverse to said longitudinal axis; and
   a locking pin, wherein said locking pin is engageable with said at least one aperture in said flange and said at least one of said notches in said retainer, wherein said locking pin is aligned with said at least one notch in said retainer when said notch on said flange is aligned with at least one notch on said retainer.

2. The locking fastener of claim 1, where said notch along the periphery of said flange is U-shaped.

3. The locking fastener of claim 1, wherein said locking pin is a socket head cap screw.

4. The locking fastener of claim 1, wherein said flange includes at least two apertures extending therethrough.

5. The locking fastener of claim 4, wherein said at least two apertures as spaced 180 degrees apart from each other.

6. The locking fastener of claim 1, wherein said retainer has an outer margin defining thirty notches.

7. The locking fastener of claim 1, wherein said threaded rotatable fastener includes a plurality of wrenching flats and said notch along the periphery of said threaded rotatable fastener is centered on one of said wrenching flats.

8. The locking fastener of claim 7, wherein at least one of said apertures on said flange is centered on one of said wrenching flats.

9. The locking fastener of claim 1, wherein said threaded rotatable fastener comprises a forged metal.

10. The locking fastener assembly of claim 1, wherein said plurality of notches are U-shaped.

11. A locking fastener assembly comprising:
a threaded member having a slot and a longitudinal axis;
a threaded rotatable fastener having a flange, said flange having a periphery and including at least one aperture extending through the flange, wherein said threaded rotatable fastener is engageable with said threaded member, said rotatable fastener including alignment means, wherein there is an angle between the radial location of said alignment means and the radial location of said at least one aperture;
a retainer having an outer margin defining a plurality of notches, said retainer further including a protruding member, wherein said protruding member is engageable with said slot on said threaded member and wherein said alignment means and said plurality of notches on said retainer are substantially the same size in a plane transverse to said longitudinal axis; and
a locking pin, wherein said locking pin is engageable with said at least one aperture in said flange and at least one of said notches in said retainer, wherein said locking pin is aligned with said at least one notch in said retainer when said alignment means on said rotatable fastener is aligned with at least one notch on said retainer.

12. The locking fastener of claim 11, where said alignment means comprise a notch along the periphery of said flange.

13. The locking fastener of claim 12, wherein said notch is U-shaped.

14. The locking fastener of claim 11, wherein said retainer has an outer margin defining thirty notches.

15. The locking fastener assembly of claim 11, wherein said plurality of notches are U-shaped.

16. A locking fastener assembly comprising:
a threaded member having a slot and a longitudinal axis;
a threaded rotatable fastener comprising forged metal and having a flange, said flange having a periphery and including at least two circular apertures extending through the flange, wherein said threaded rotatable fastener is engageable with said threaded member, said flange further including a U-shaped notch along the periphery of said flange wherein there is an angle between the radial location of said notch and the radial location of said at least two circular apertures;
a retainer having an outer margin defining at least 30 notches, said retainer further including a protruding member, wherein said protruding member is engageable with said slot on said threaded member and wherein said notch on said rotatable fastener and said at least 30 notches on said retainer are substantially the same size in a plane transverse to said longitudinal axis; and
a locking pin, wherein said locking pin is engageable with at least one of said apertures in said flange and at least one of said notches in said retainer, wherein said locking pin is aligned with said at least one notch in said retainer when said U-shaped notch on said flange is aligned with at least one notch on said retainer.

17. The locking fastener assembly of claim 16, wherein said at least 30 notches are U-shaped.

* * * * *